(No Model.)  5 Sheets—Sheet 1.
D. W. MARMON.
ROLLER MILL.
No. 274,508.  Patented Mar. 27, 1883.
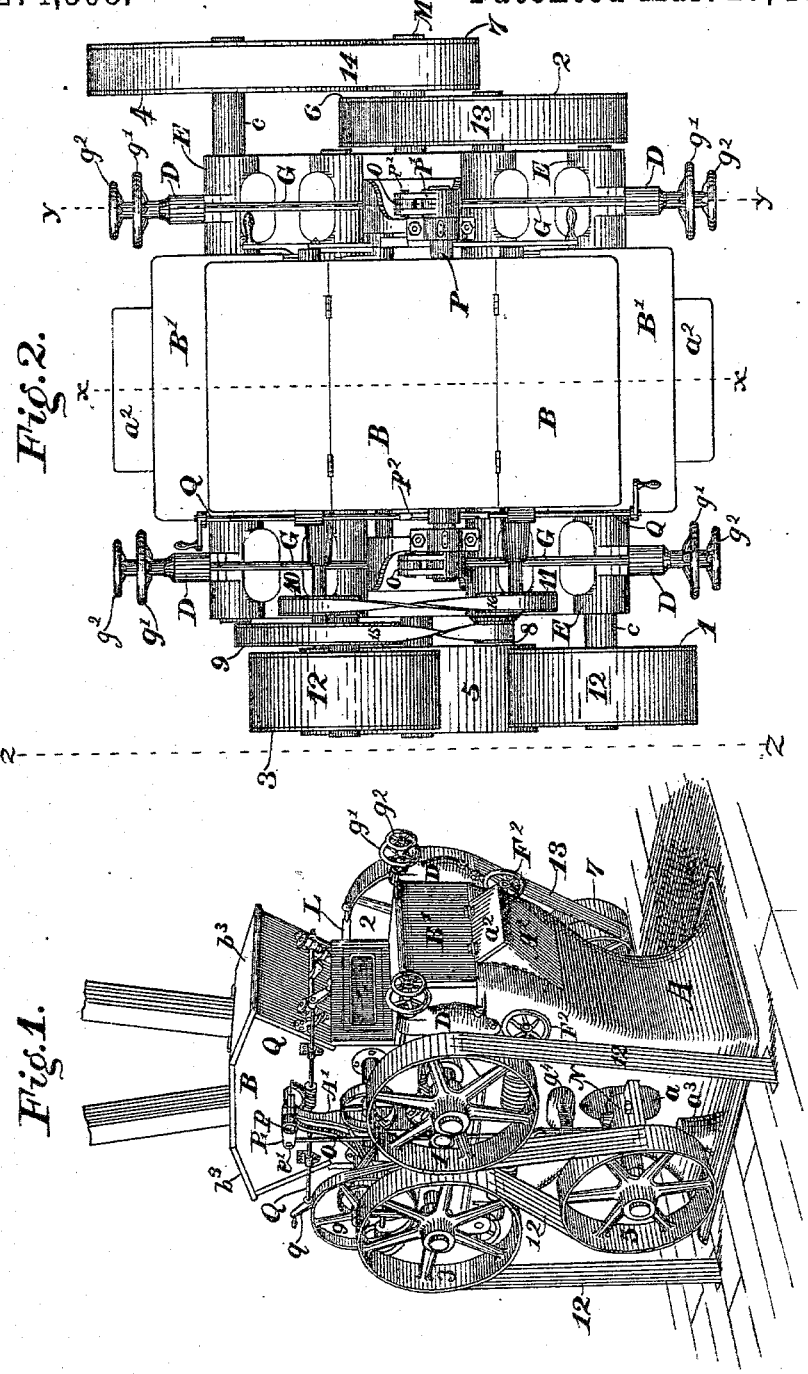
WITNESSES.  
Chas. N. Leonard.  
E. W. Bradford.
INVENTOR.  
Daniel W. Marmon,  
PER  
C. Bradford,  
ATTORNEY.

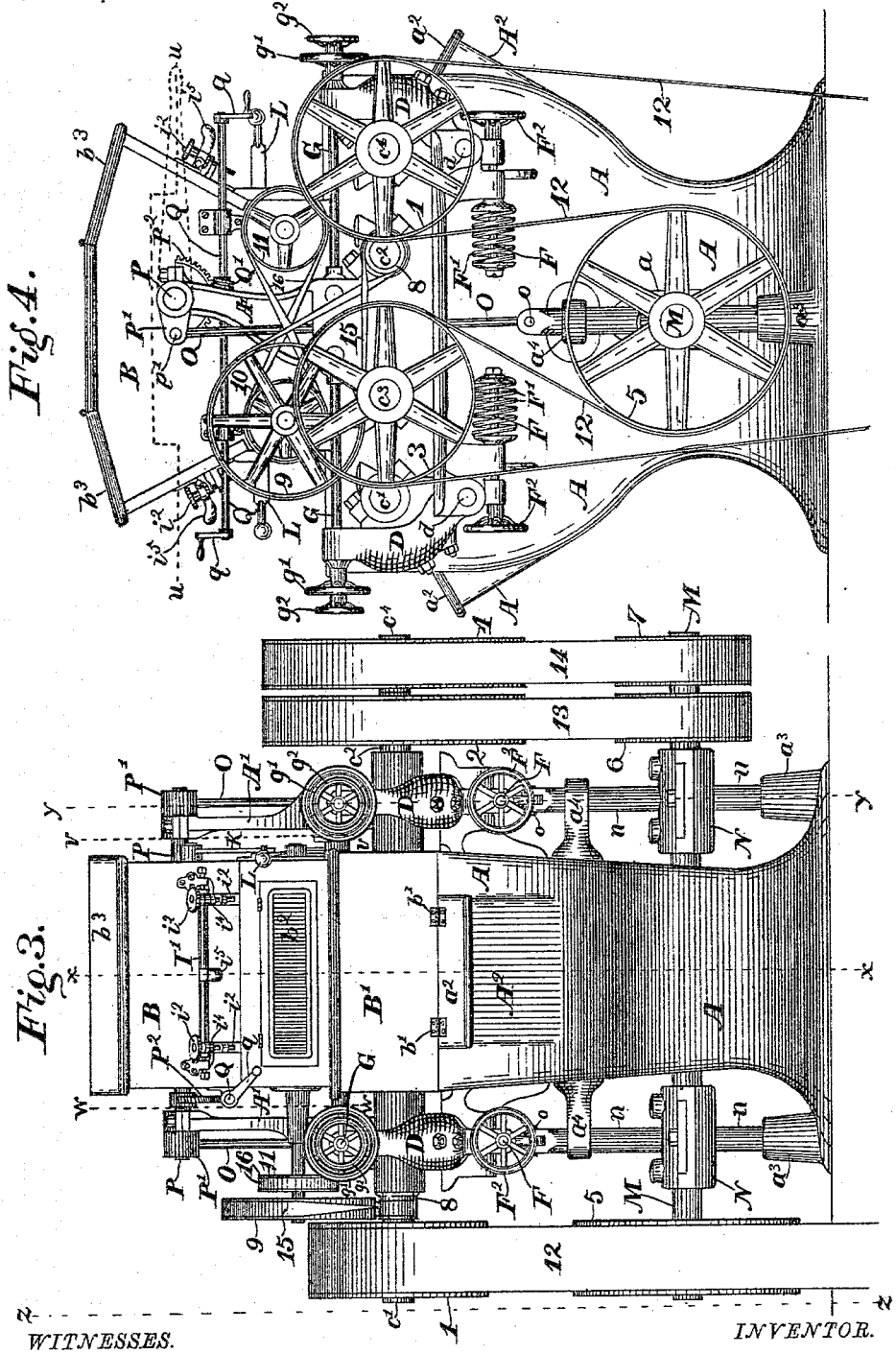

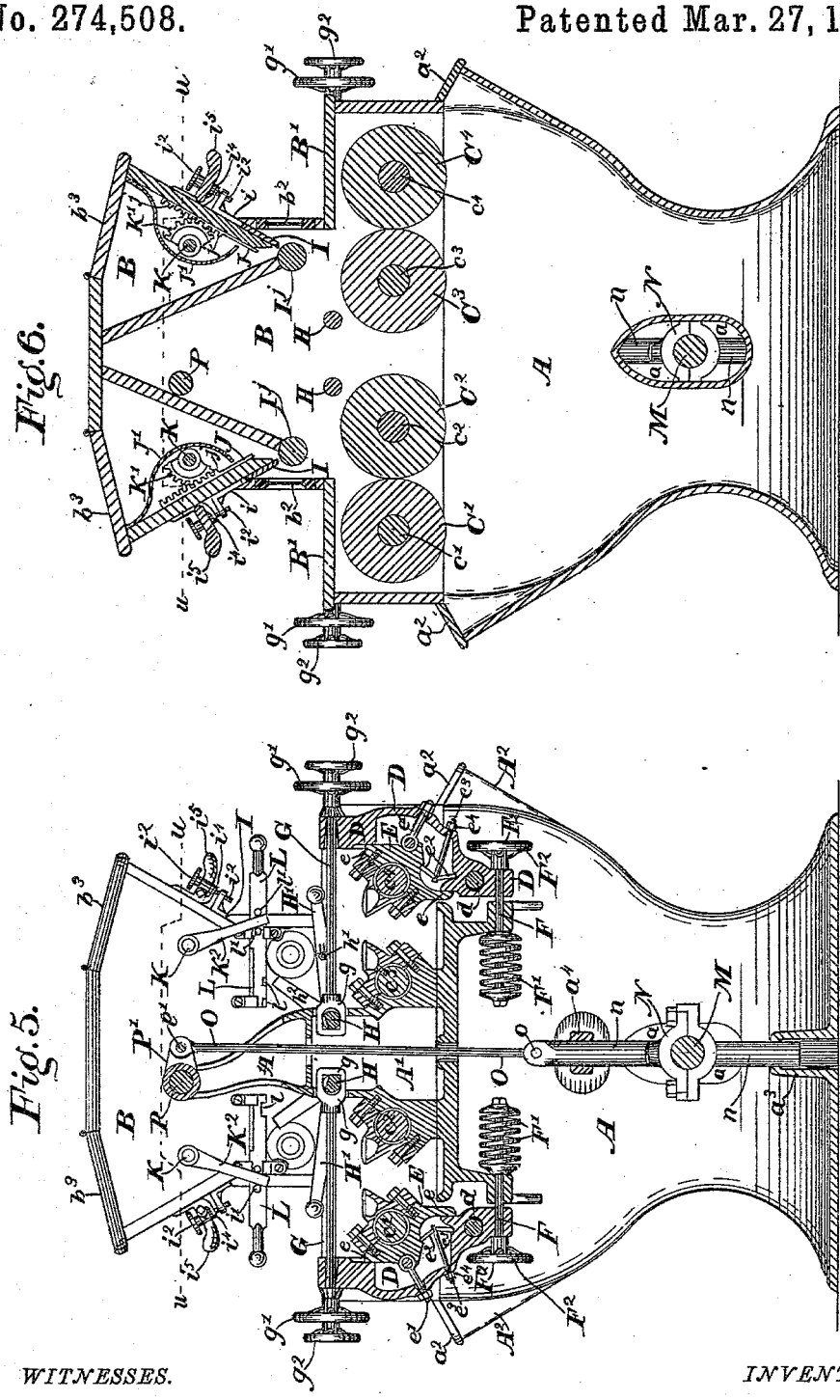

(No Model.) 5 Sheets—Sheet 4.

D. W. MARMON.
ROLLER MILL.

No. 274,508. Patented Mar. 27, 1883.

WITNESSES.
Chas. N. Leonard,
E. W. Bradford.

INVENTOR.
Daniel W. Marmon,
PER
C. Bradford,
ATTORNEY.

N. PETERS, Photo-Lithographer, Washington, D. C.

(No Model.) 5 Sheets—Sheet 5.
D. W. MARMON.
ROLLER MILL.
No. 274,508. Patented Mar. 27, 1883.
Fig. 15.
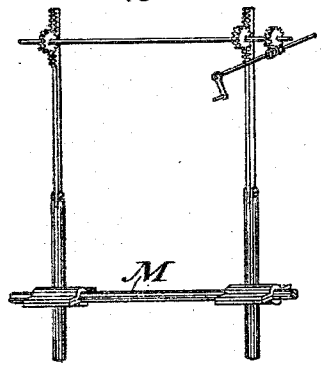
Fig. 16.
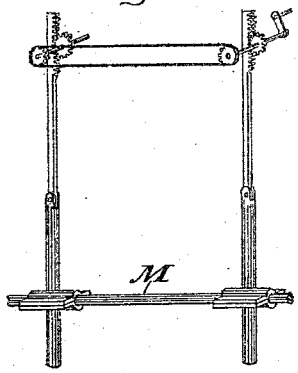
Fig. 17.
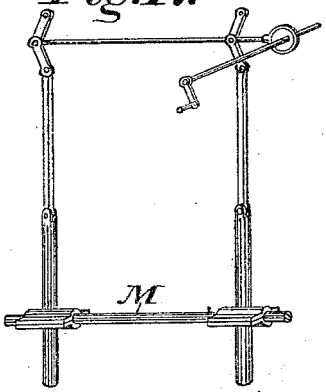
Fig. 18.
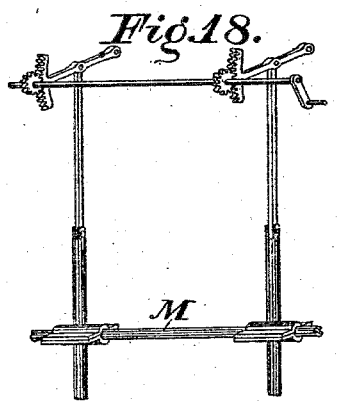
Fig. 19.
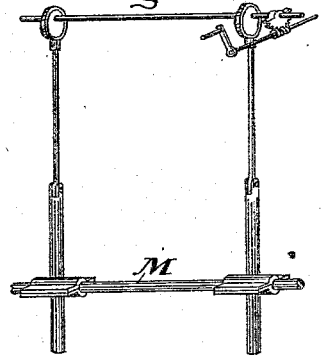
Fig. 20.
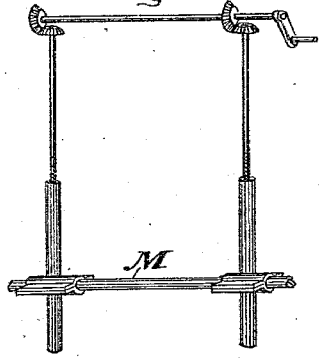
Fig. 21.
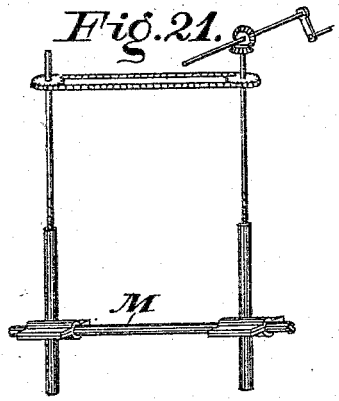
Fig. 22.
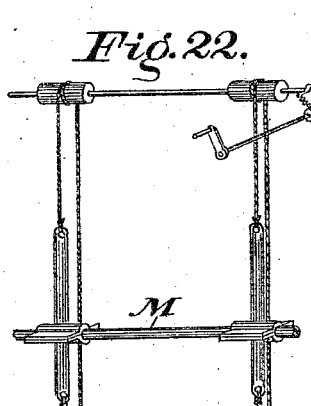
Fig. 23.
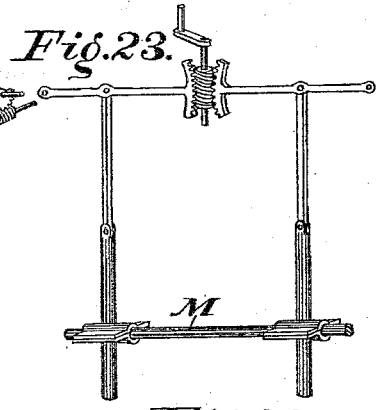
Fig. 24.
Fig. 25.
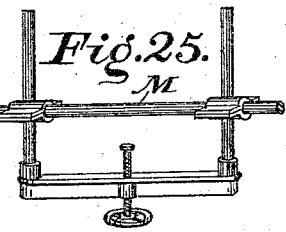
Fig. 26
WITNESSES.
Chas. N. Leonard
E. W. Bradford.
INVENTOR.
Daniel W. Marmon,
PER
C. Bradford
ATTORNEY.
N. PETERS, Photo-Lithographer, Washington, D. C.

UNITED STATES PATENT OFFICE.

DANIEL W. MARMON, OF INDIANAPOLIS, INDIANA, ASSIGNOR TO THE NORDYKE & MARMON COMPANY OF INDIANA.

ROLLER-MILL.

SPECIFICATION forming part of Letters Patent No. 274,508, dated March 27, 1883.

Application filed November 27, 1882. (No model.)

*To all whom it may concern:*

Be it known that I, DANIEL W. MARMON, of the city of Indianapolis, county of Marion, and State of Indiana, have invented certain new and useful Improvements in Roller-Mills, of which the following is a specification.

My said invention consists in certain improvements in the construction and arrangement of parts in that class of machinery for the reduction of grain known as "roller-mills," whereby a machine is produced having many new and desirable features, as will hereinafter be more fully set forth.

Figure 7:
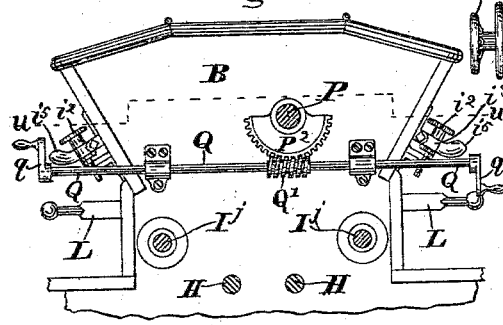
Figure 10:
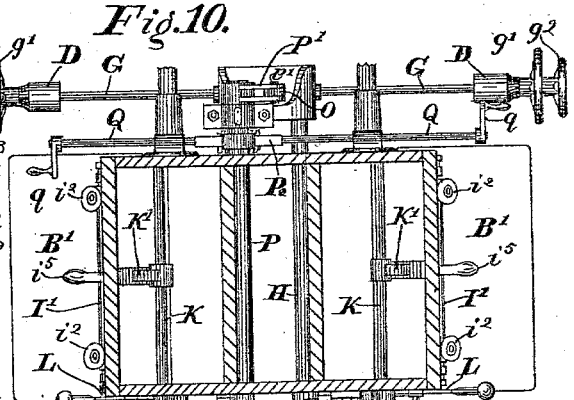
Figure 8:
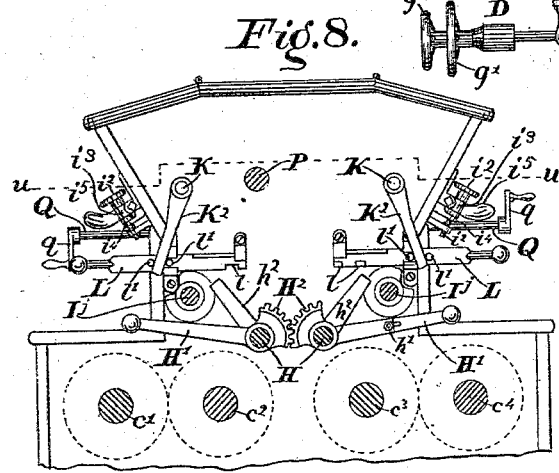
Figure 11:
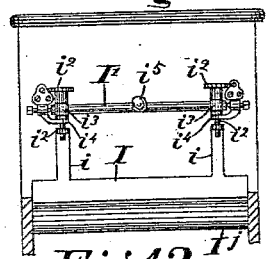
Figure 9:
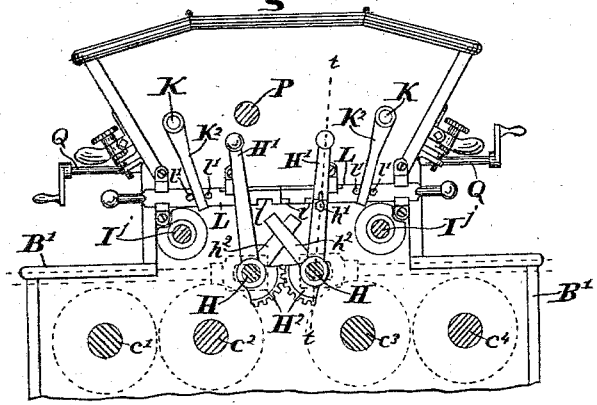
Figure 12:
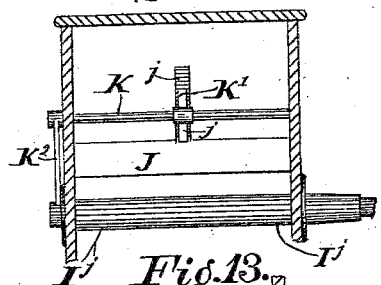
Figure 13:
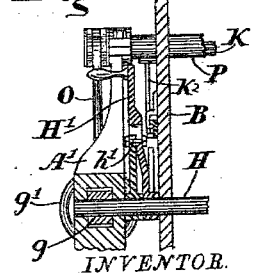
Figure 14:
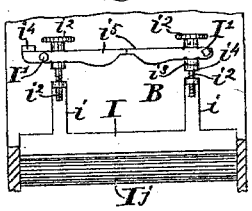

Referring to the accompanying drawings, which are made a part hereof, and on which similar letters of reference indicate similar parts, Figure 1 is a perspective view of a machine embodying my invention; Fig. 2, a top or plan view of the same; Fig. 3, a front elevation thereof; Fig. 4, an end elevation as seen from the dotted line $z\ z$ at the left of Figs. 2 and 3; Fig. 5, a transverse vertical section looking to the left from the dotted line $y\ y$ in Figs. 2 and 3; Fig. 6, a transverse vertical section looking to the left from the dotted line $x\ x$ in Figs. 2 and 3; Fig. 7, a view of one end of the upper portion of the mill as seen from the dotted line $w\ w$ in Fig. 3; Fig. 8, a similar view of the other end thereof as seen from the dotted line $v\ v$ in Fig. 3; Fig. 9, a view like Fig. 8, except that the mechanism is shown in the other position, as when the mill is out of operation; Fig. 10, a horizontal sectional view, looking downwardly from the dotted line $u\ u$ in Figs. 4, 5, 6, 7, and 8; Fig. 11, a view of one of the outside feed-gates, the feed-roll in connection with which it operates, and the portion of the hopper on which said gate is mounted, all other parts being removed; Fig. 12, a similar view of one of the inside feed-gates and the feed-roll in connection with which it operates; Fig. 13, a sectional view looking toward the left from the dotted line $t\ t$ in Fig. 9; Fig. 14, an alternate construction of the mechanism for moving the feed-gate I; and Figs. 15 to 26, inclusive, show alternate constructions of the mechanism for adjusting the counter-shaft. Figs. 1 to 8, inclusive, and Figs. 10, 11, 12, and 14 show the mechanism in the position it occupies when the machine is in operation, the rolls in grinding relation, and the feed-gates open. Figs. 9 and 13 show the mechanism in the position it occupies when the machine is at rest, the grinding-rolls parted, and the feed-gates closed. Figs. 15 to 26, inclusive, show alternate constructions of the counter-shaft adjusting mechanism, without reference to position.

In said drawings, the portions marked A A' represent the supporting frame-work of the mill; B B', the hopper and other covering portions; C' C² C³ C⁴, the grinding-rolls; D, swinging arms, in which one of each pair of rolls is mounted; E, adjustable boxes, mounted on said arms; F, tempering rods or screws for adjusting the maximum force of the grinding pressure; G, distance or adjusting rods for regulating the position of the arms; H, flattened or cam-faced shafts, to which said rods are attached and by which they are operated; I, the outside feed-gates; J, the inside feed-gates; K, shafts for operating said gates J; L, bars for operating said shafts; M, a counter-shaft; N, the journal-boxes therefor; O, rods connected to said journal-boxes; P, a shaft passing from side to side of the machine, to which said rods are connected; Q, a cross-shaft connected to the shaft P by a worm-gear, and the numerals 1 to 16, inclusive, the several pulleys and belts by which the machine is driven.

The frame A A' is mainly a large hollow casting adapted to support the machinery of a roller-mill. In general outline it is substantially a well-known form. The tunnel $a$ is formed therein to receive the counter-shaft M and permit it to pass through from end to end without coming in contact with the ground material as it falls from the grinding-rolls. The location and arrangement of this tunnel afford the best facilities for the connections to be so made to the ends of this counter-shaft as to provide for a simultaneous adjustment thereof toward or from the roll-shafts. Spout-like projections A² on the sides of the frame form openings into the sides of the mill. Other projections or lugs are formed upon or attached to this frame, and serve as supports or bearings for various portions of the mechanism.

The hopper and covers B B' are preferably constructed of wood. The main portion B is intended to be substantially stationary, and should have doors $b^2$ and covers $b^3$. Said doors $b^2$ are constructed partly of glass, so that the inside of the mill may be seen without opening them. The side portions, B', are simply covers, and are removable in the ordinary manner, so that the grinding-rolls may be removed without disturbing the hopper or main portion B. The covers $a^2$ of the openings into the sides of the mill are connected to the sides of these portions B' by hinges $b'$.

The several rolls C' $C^2$ $C^3$ $C^4$ are the crushing or grinding rolls common to roller-mills. They are respectively mounted upon the shafts c' $c^2$ $c^3$ $c^4$, and are driven by the pulleys 1 2 3 4, the first and third by the main belt 12, running under the pulley 5 on the counter-shaft M, and the second and fourth by separate belts 13 and 14, running from the pulleys 6 and 7 on said counter-shaft to said pulleys 2 and 4. It is essential that the two rolls of each pair have their axes in the same plane; but from unequal wear of journals, journal-boxes, or other causes they may, after use, vary from this plane. To correct this variation from a common plane, I raise or lower the journal-boxes of either one or the other roll. As the arms D have only a movement substantially to or from the fixed roll, the boxes E are secured to them so as to move the roll up or down on the arms, as will be presently more fully described. Preferably I move the journal box or boxes of the roll supported on the swinging arms D, but do not confine myself to the adjustment of these boxes, as I may arrange to adjust the boxes of the fixed roll.

The arms D are mounted upon pins $d$, which pass through their lower ends and through lugs or bosses on the frame A. The holes in these arms through which said pins pass are elongated, (see particularly Fig. 5,) which allows the arms to move slightly on said pins, or, in other words, permits the lower ends of said arms to be crowded outwardly somewhat by the roll supported thereby when necessary, as in case a substance too hard to be crushed or ground should come between said roll and its fellow.

The boxes E have bearing-surfaces $e$, which rest against similar surfaces on the arms D. They are secured in position by the bolts $e'$, which should be set at an angle, as shown, and are adjusted vertically by the toggles, which are placed between said arms and said boxes, and are fitted to rest in suitable seats therein, as shown. A bolt, $e^3$, is attached to or forms part of each toggle, and passes to the outside, where it is provided with a nut, $e^4$, by which it may be drawn to the required position and the box thus adjusted. The toggles are preferably formed by providing two short pieces, $e^2$, having convex ends, forming concave seats in the arm, box, and both sides of the bolt $e^3$, and seating said pieces therein, as shown. (See Fig. 5.) The pieces $e^2$ may, however, be jointed together in the ordinary manner and the bolt $e^3$ attached to the hinge-pivot. When the box has been adjusted to the desired position, it is secured against further movement by tightening up the bolt $e'$, which forces said box tightly against its seat and also against the toggle. The adjustable boxes might be placed on the frame portion A', if desired, and the rigid boxes on the arms D, without departing from my invention, so long as the means of adjustment remain substantially the same.

The tempering-rods F pass through the lower ends of the arms D, below or beyond their pivots, through a lug or projection on the frame or casting A, and through a coiled spring, F'. One end of each of said rods is screw-threaded, and some sort of nut, preferably a hand-wheel, $F^2$, is placed thereon. These hand-wheels are turned up until the desired amount of strain for an effective grinding pressure is brought on the arms, which holds the rolls in proper position, the tension of the spring force being at all times greater at the pivots or fulcrums in one direction than the grinding resistance is in the other direction, except when a hard substance passes between the rolls, in which case the hard substance parts the rolls, forcing the arms outwardly and compressing the springs still further, a movement of said arms toward or from the center of the machine being permitted by the elongated holes therein through which the pivot-pins $d$ pass. As will be seen, said pins $d$ serve the several purposes of supports for the arms, as pivots and fulcrums over which they move, and as fixed stops to limit their inward movement. After the hard substance is discharged the return travel of the arms is stopped by said arms coming in contact with the pins $d$, as illustrated most plainly in Fig. 5. The springs, while acting to draw the lower ends of the arms supporting the movable roll inwardly toward the fixed roll of the pair until the arms come in contact with the pins $d$, also operate to hold said movable roll away from said fixed roll by reason of being on the opposite sides of the fulcrums or pivot-pins from said movable roll. This spring force on the arms D, which moves their upper or roll-bearing ends away from the fixed roll, acts in the same direction as the force exerted by the resistance of the material passing between the rolls. Thus the tension on the adjusting-rods G is always in the same direction, and all "lost motion" or play in the joints of the swinging arms, adjusting-rods, &c., is taken up in the same direction, both by the action of the machine itself and the grinding strain.

The adjusting-rods G are for the purpose of moving the upper ends of the arms D back and forth, and thus positioning the individual rolls of the pairs nearer to or farther from each other. Each is attached to a flattened or cam-faced rod at the inner end, and thus as said shafts are rotated, so that their greater or lesser sides operate upon said rods, they are drawn in or out, and the grinding-rolls thus held into grinding relation (see Figs. 6 and 8) or permitted to part from such relation. (See Fig. 9.) The preferable method of forming the attachment is to form upon or attach to the rods G eye-pieces $g$, (see Fig. 5,) the eyes wherein are sufficiently large to permit the rods H to pass through them freely, and place said eyes over said rods, as shown. Each rod should be provided with a hand-nut, $g'$, and a hand lock-nut, $g^2$, by which the arms may be adjusted to proper position, and there secured from accidental variation. The grinding-rolls supported by said arms are thus positioned nearer to or farther from their fellows or brought into parallelism therewith.

The shafts H extend through the machine from end to end and through the eyes in the inner ends of the rods G. At each point of contact with said eyes one side of the shaft is flattened or otherwise fitted to operate as a cam. The turning of the flattened or lesser sides toward the inner sides of said eyes permits said rods G and the arms D to drop back and the rolls to separate from grinding relation, while the turning of the round or greater sides toward said sides of the eyes draws said rods G and arms D toward the center of the machine and brings the rolls into grinding relation, as before. Levers or handles H' are mounted upon the rods H as a convenient means of operating them, and these levers are extended into segments of gear-wheels H² at their lower or inner ends, which mesh into each other, whereby a simultaneous movement of both is secured. One of said gear-segments may be separated and move independently from its lever or handle in case it is desired to operate the various devices upon one side of the machine, and not those upon the other. This is effected by splitting the handle, as shown most plainly in Fig. 13, and forming a slot in both portions, through which a bolt, $h'$, shall pass. When it is desired that the two sides be fastened together the bolt $h'$ is slipped to the bottom of the slot, as shown, and there fastened, which makes the handle and segment practically one piece and causes said handles and segments to operate together. When it is desired to operate but one side of the machine the bolt $h'$ is moved to the top of the slot, and the handle and segments are then independent. This segment being loosely mounted on the shaft, the opposite handle can be moved without moving the shaft this segment is on. By means of the arrangement of mechanism just described either or both of the pairs of rolls can be parted from grinding relation, and thus restored to exactly their former relation, without the trouble and delay incident to a readjustment of the machine. Upon the lower ends of the levers H' are projections $h^2$, which, as said levers are thrown back and forth, engage with the lugs or notches $l$ on the bars L, and thus operate said bars, and through them, the arms K², and shafts K the feed-gates J. As will be readily understood, when the levers or handles H' are divided, and thus adapted to operate separately, they operate the bars L and the feed-gates separately, as well as the rolls.

The feed-gates I are thin blades, which run along near the feed-rolls I³, and are hung upon rock-shafts I' by means of the upwardly-projecting arms $i$ and the attaching-screws $i^2$. Said screws pass through holes in lugs $i^3$ on said rock-shafts, through or alongside projections $i^4$, which act as stops, and into or through the upper ends of the arms $i$, which are tapped or screw-threaded to receive them. The distance said gates shall be from said feed-rolls when at rest is determined by said screws, by which said gates are adjusted up and down, as desired. A projection, $i^5$, on the rock-shaft I' acts as a weight and holds the lugs $i^3$ down against the stops $i^4$ and the gate I down to position, except when purposely raised. In practice it frequently occurs that some substance gets between the feed-gate I and the feed-roll that will not pass through, but remains there, obstructing the desired flow of grain. It also sometimes happens that the grain itself becomes clogged. In order to let the obstructing substance pass or to start the clogged grain, it is desirable to raise the feed-gates temporarily without disturbing the regular adjustment. This is accomplished by means of the mechanism just described. The operator, by lifting the projection $i^5$, turns the rock-shaft, lifts the screws $i^2$ by means of the lugs $i^3$, and raises the gate I. When the projection or weight $i^5$ is released the rock-shaft returns to its former position, with the lugs $i^3$ resting on the fixed stops $i^4$, and the feed-gate is returned to exactly its former position, and the work proceeds as before. In the alternate construction shown in Fig. 14 there is employed, instead of the rock-shaft and one weight, two separate levers, constructed to serve also as weights; but there are present the same essential elements—a pivoted weight to hold the gate down and a fixed stop to prevent it from going too far. The stops may be variously arranged, (several different arrangements are shown,) and a spring might be substituted for the weight without departing from my invention in this particular.

The feed-gates J are in themselves similar in form to the gates I. They are, however, operated in a different manner, and serve as cut-off gates to entirely shut off the flow of grain, instead of simply regulating said flow, as the gates I do. The upwardly-projecting arms $j$ thereon have their upper portions formed into rack-bars, which engage with pinions or segments on the shafts K, as shown most plainly in Fig. 6. This gearing is protected from contact with the grain in the hopper by the hood J'. The feed-rolls I³ are driven toward the feed-gates by the arrangement of belts shown most plainly in Fig. 4.

The shafts K have upon them, preferably at or near their centers, the segments or pinions K', which engage with the rack portions of the arms $j$ on the feed-gates, and thus open or close said feed-gates as said shafts are partially rotated in one or the other direction. These shafts have also arms K², which pass down between lugs $l'\ l'$ on the bars L, and are thereby moved from the position shown in Fig. 8 to that shown in Fig. 9 as said bars are moved back and forth, and thus give these shafts K the necessary movement to open or close the feed-gates.

The bars L are the mediums through which the shafts K are rotated, and the feed-gates thereby opened or closed. When it is desired that the feed-gates shall be closed these bars L are moved toward each other, carrying the arms K² with them and changing the position of said arms from that shown in Fig. 8 to that shown in Fig. 9, which rotates the shafts K outwardly, and, through the segments or pinions K', forces down the arms $j$, and with them the gates J. When it is desired to open the gates the above-described operation is reversed and the parts are restored to their former positions. As hereinbefore stated, the levers H' preferably have projections $h^2$, which come in contact with the lugs $l\ l$ on these bars, whereby the feed-gates are opened or closed by the same movement that throws the grinding-rolls toward or from each other. In order that this operation shall not be prevented by the independent working of the bars L, the projections $h^2$ are arranged in such relation to the lugs $l$ that they will only engage with said lugs when they are moving from one of the positions where they are at rest to the other. The bars L are so supported that their ends will raise somewhat, and if, in moving from side to side, a projection, $h^2$, should come in contact with a lug, $l$, it would raise said bar and pass under said lug to a position between it and the other lug of the pair, and in its further movement would come in contact with said other lug and force the bar to the proper position therefor when at rest. When the levers or handles H' are swung to the limit of their movement in either direction, (see Figs. 5, 8, and 9,) the projections $h^2$ are entirely free from the lugs $l$, and the bars L can be moved back and forth entirely independently thereof. It will be readily understood that either of the bars L can be moved independently of the other, and either feed-gate thus opened or closed without disturbing the other gate.

The counter-shaft M is mounted in boxes N. When this shaft is raised or lowered it loosens or tightens the several belts employed to run the grinding-rolls, as will be readily understood by an examination of the drawings. As will also be readily understood, this counter-shaft runs in the opposite direction from that in which the rolls C' C³ run, and thus drives the rolls C² C⁴ also in the opposite direction to said rolls C' C³. This causes the adjacent faces of the individual rolls forming each pair to run in the same direction, instead of oppositely, as would be the case if the rolls themselves ran in the same direction.

The boxes N are provided with extensions $n$, which pass through bearings in the lugs $a^3$ $a^4$ on the frame A, and are adapted to slide therein.

The rods O are attached to the upper extensions of the boxes N either by pivots $o$, as shown, or otherwise, and pass up through bearings in the frame A A', preferably to near the top of the machine, and are there attached to the rock-arms P' on the cross-shaft P by means of the pivots $p'$.

The shaft P runs across from side to side of the machine, and has mounted thereon the arms P' and the worm-wheel P². It is adapted to be partly rotated or rocked, and thus raise or lower the rods O, and with them the counter-shaft.

The shaft Q is mounted in bearings attached to the end of the hopper B, and has a worm, Q', mounted thereon, which engages with the worm-wheel P² on the shaft P. It extends out on both sides of the machine, and has a crank, $q$, on each end, and is thus adapted to be operated from either side of the machine. This is much more convenient than the previous means of adjusting the counter-shaft, which have been operated from the ends of the machine by reaching over the belts, or from some equally awkward or unhandy position.

The several pulleys and belts operate as follows: The main belt 12 drives the pulleys 1, 3, and 5, and thus the rolls C' and C³, in one direction and the counter-shaft M in the other direction. The counter-shaft, through the pulleys 6 and 7 and belts 13 and 14, running therefrom to the pulleys 2 and 4, drives the rolls C² and C⁴ in the opposite direction to that in which the rolls C' and C³ are driven. The roll C² has on its shaft the small pulley 8, which, through the belt 15, drives the pulley 9, one of the feed-rolls I³, and the pulley 10 on the same shaft therewith, and this pulley 10, through the belt 16, drives the pulley 11 and the other feed-roll.

The various principal operations of my said invention may be recapitulated as follows: The grain is fed through the hopper by means of the feed-gates I J and feed-rolls I³ to the grinding-rolls, which reduce or grind it in the ordinary manner. These rolls are adjusted vertically by the movement of the boxes E on the arms D and laterally by the adjusting-rods G. When it is desired to vary the relations of the rolls, it may readily be accomplished by turning either the nuts $e^4$ or the hand-nuts $g^2$, or both, according to the variation desired. When it is desired to temporarily part the rolls (thus stopping the grinding) and shut off the feed, it is done by partly rotating the shafts H by means of the handle H', thus bringing the flat sides of said shafts around against the corresponding side of the eye in the eye-piece $g$, (see especially dotted lines in Fig. 9,) and thus permit the rods G, and with them the arms D, to move back from the center and the rolls to part. The projections $h^2$ on the handles H' at the same time operate the bars L, which move the arms $K^2$, thus partially rotating the shafts K and causing the gates J to close down against the hopper B and shut off the flow of grain. A reversing of this motion brings all of said parts back into exactly their former positions, and the grinding proceeds.

Many of the devices and combinations shown and described herein are the invention of Jesse Warrington, or the joint invention of said Warrington and myself. They are therefore, of course, not claimed in this application, but are made the subject-matter of other applications for Letters Patent either granted, pending, or in course of preparation. Some of the alternate constructions of mechanism for adjusting the counter-shaft are also the inventions of others, so far as the specific devices are concerned. I regard myself, however, as the first inventor of a roller-mill having a counter-shaft extending from end to end of the mill parallel with the roll-shafts and simultaneously adjustable as a whole toward or from the roll-shafts. I therefore intend to claim the above invention, broadly, in this application, together with the specific means shown in the principal drawings, leaving the other constructions to be covered specifically by other Letters Patent, the applications for which have been or may be made either by myself or by others. All these constructions, except those already patented or for which applications have been made, are expressly reserved as the subject-matter of future applications for Letters Patent by the proper inventor or inventors. Still other modifications have been invented; but they are thought to be clearly the equivalent of those shown, and therefore no further illustration is deemed necessary. Among the changes which may be made I will mention that the cross-shaft Q is frequently dispensed with, especially in the smaller mills, and a common crank or lever attached directly to the shaft P, a lever of appropriate form being shown by dotted lines in Fig. 4 and a crank in some of the alternate constructions, particularly Fig. 20.

Having thus fully described my said invention, what I claim as new, and desire to secure by Letters Patent, is—

1. The combination, in a roller-mill, of the supporting frame-work, the roll-shafts, a counter-shaft extending from end to end of the machine, substantially parallel with said roll-shafts, pulleys on the several shafts, belts connecting the same, and means for adjusting both ends of said counter-shaft simultaneously, whereby the belts at both ends of the machine are tightened or loosened at one operation, substantially as set forth.

2. In a roller-mill, the combination of the frame, the roll-shafts, the counter-shaft M, extending from end to end of the machine, pulleys on said shafts, belts connecting said pulleys, and the simultaneously-adjustable boxes N for supporting the counter-shaft, substantially as described, and for the purposes specified.

3. The combination, in a roller-mill, of the frame A, supporting the rolls and roll-shafts, and having a tunnel through or under the same said roll-shafts, a counter-shaft passing through said tunnel from end to end of the machine, pulleys on said shafts, belts for driving the same, and means for adjusting both ends of said counter-shaft simultaneously, whereby the belts on both ends of said counter-shaft are tightened or loosened at one operation, substantially as set forth.

4. The combination, in a roller-mill, of the frame, the roll-shafts, the counter-shaft, pulleys on said shafts, belts connecting said pulleys, the rods O, the cross-shaft P, having arms P', and means for operating the same.

5. The combination, in a roller-mill, of the frame, the roll-shafts, counter-shaft, pulleys on said shafts, belts connecting said pulleys, the boxes N, the rods O, cross-shaft Q, and means for connecting said rods and cross-shaft, whereby said counter-shaft is rendered adjustable from the sides of the machine, substantially as set forth.

6. The combination, in a roller-mill, of the frame, the roll-shafts, the counter-shaft, pulleys on said shafts, belts connecting said pulleys, the shaft P, rods connecting the boxes of said counter-shaft to arms on said shaft P, the shaft Q, and a worm-gear connecting said shafts P and Q, substantially as described, and for the purposes specified.

7. The combination of the bars L, having lugs $l\ l$, the shafts K, having arms $K^2$ and pinions or segments K', and the feed-gates J, having upwardly-projecting rack-arms $j$, all substantially as shown and specified.

8. The combination of the feed-gates I, having arms $i$, the rocking devices I', to which said arms are attached, and stops $i^4$, substantially as shown and specified.

9. The combination, in a roller-mill, of the journal-boxes, supports therefor, and means of adjusting and securing said boxes, consisting of the toggles and securing-bolts, substantially as set forth.

10. The combination of the swinging arms D, boxes E, toggles and bolts $e^2\ e^3$, and securing-bolts $e'$, substantially as shown and specified.

In witness whereof I have hereunto set my hand and seal, at Indianapolis, Indiana, this 21st day of November, A. D. 1882.

DANIEL W. MARMON. [L. S.]

In presence of—
C. BRADFORD,
E. W. BRADFORD.